United States Patent
Chang et al.

(10) Patent No.: US 7,870,285 B2
(45) Date of Patent: Jan. 11, 2011

(54) MITIGATING SUBSCRIBER SIDE ATTACKS IN A CABLE NETWORK

(75) Inventors: Che-Ming Chang, Cary, NC (US); Gangadharan Byju Pularikkal, Morrisville, NC (US)

(73) Assignee: Cisco Technology, Inc., San Jose, CA (US)

(*) Notice: Subject to any disclaimer, the term of this patent is extended or adjusted under 35 U.S.C. 154(b) by 529 days.

(21) Appl. No.: 11/871,894

(22) Filed: Oct. 12, 2007

(65) Prior Publication Data

US 2009/0100487 A1    Apr. 16, 2009

(51) Int. Cl.
*G06F 15/16* (2006.01)
*G06F 15/173* (2006.01)
*H04N 7/173* (2006.01)

(52) U.S. Cl. .................... 709/232; 709/226; 725/95
(58) Field of Classification Search ............. 709/226, 709/232; 725/95
See application file for complete search history.

(56) References Cited

U.S. PATENT DOCUMENTS

| | | | | |
|---|---|---|---|---|
| 6,650,624 | B1* | 11/2003 | Quigley et al. | 370/252 |
| 2002/0095684 | A1* | 7/2002 | St. John et al. | 725/95 |
| 2005/0052992 | A1* | 3/2005 | Cloonan et al. | 370/229 |
| 2005/0259645 | A1* | 11/2005 | Chen et al. | 370/389 |
| 2008/0120413 | A1* | 5/2008 | Mody et al. | 709/226 |

OTHER PUBLICATIONS

Cablelabs, Data-Over-Cable Service Interface Specifications DOCSIS 3.0 Security Specification, c 2006-2007 Cable Television Laboratories, Inc., http://www.cablemodem.com/specifications/specifications30.html.

* cited by examiner

*Primary Examiner*—Philip J Chea
(74) *Attorney, Agent, or Firm*—Stolowitz Ford Cowger LLP

(57) ABSTRACT

In one embodiment, a Cable Modem Termination System (CMTS) identifies an endpoint originating undesired traffic. Instead of dropping a bandwidth request for the identified endpoint by not responding, the CMTS responds to such a request by sending a data grant pending message. The data grant pending message causes a cable modem for the identified endpoint to enter a waiting state, which prevents further bandwidth requests for the identified endpoint.

16 Claims, 3 Drawing Sheets

MITIGATING SUBSCRIBER SIDE ATTACKS IN A CABLE NETWORK

TECHNICAL FIELD

The present disclosure relates generally to the field of cable networks.

BACKGROUND

Cable operators have widely deployed high-speed data services on cable television systems. These data services allow subscriber-side devices, such as personal computers, to communicate over an ordinary cable TV network Hybrid Fiber Coax (HFC) cable. A Cable Modem Termination System (CMTS) connects the cable TV network to a data network, such as the Internet. The Data Over Cable Service Interface Specification (DOCSIS) is one of the cable modem standards used for transferring data over the cable TV network.

The subscriber-side devices located behind the cable modems can be used to generate Denial of Service (DoS) attacks or other undesired packets that consume processing resources of the cable TV network. Partial solutions to this malicious traffic require the cable modem associated with the malicious traffic to support Upstream Transmitter Disable (UP-DIS) functionality. Partially because cable modems are sometimes hacked to disable UP-DIS functionality, and partially because these and other systems are not highly scalable, malicious traffic from the subscriber networks is still problematic. The disclosure that follows solves this and other problems.

DESCRIPTION OF EXAMPLE EMBODIMENTS

Overview

Figure 1:
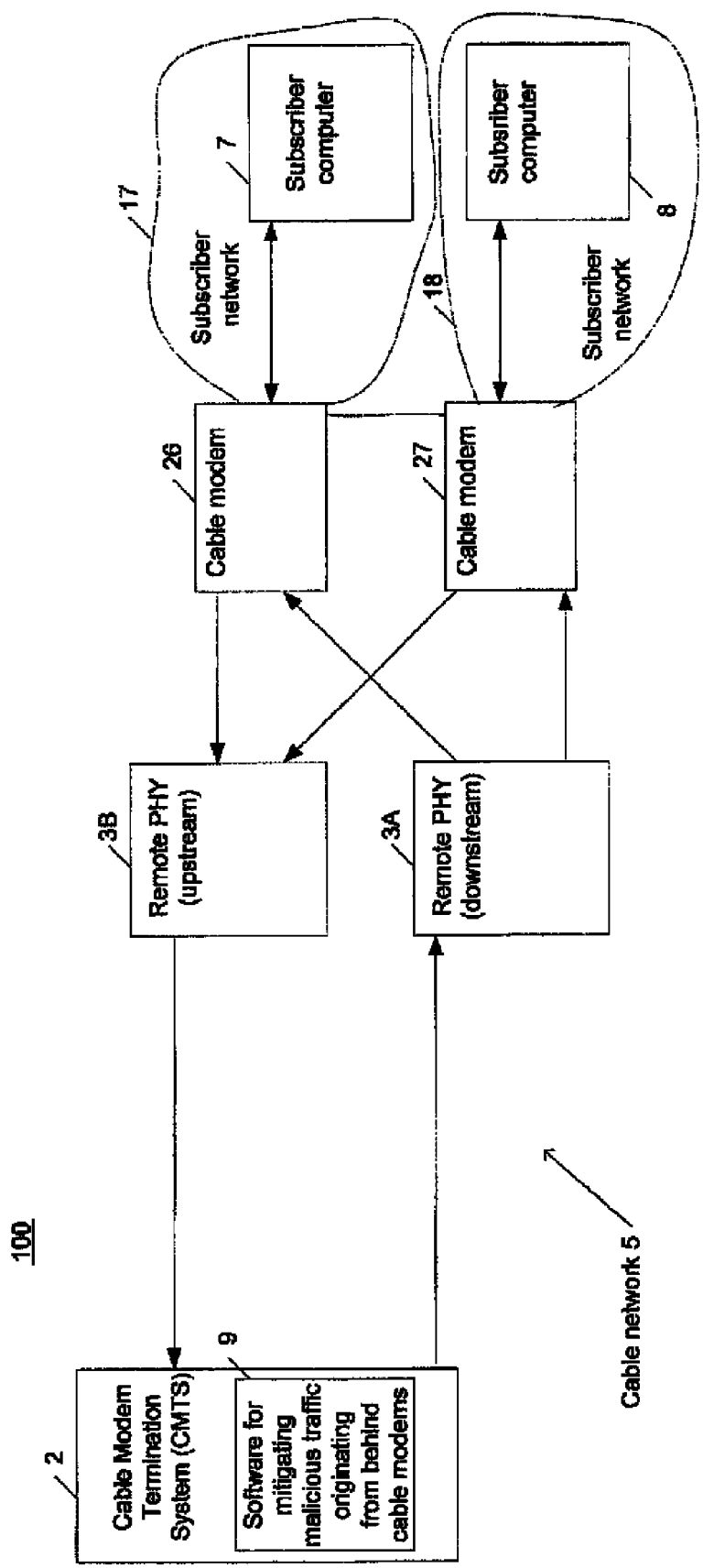
FIG. 1 illustrates an example system for mitigating subscriber side attacks in a cable network.

In one embodiment, a Cable Modem Termination System (CMTS) identifies an endpoint originating undesired traffic. Instead of rejecting a bandwidth request for the identified endpoint by not responding, the CMTS responds to such a request by sending a data grant pending message. The data grant pending message causes a cable modem for the identified endpoint to enter a waiting state, which prevents further bandwidth requests for the identified endpoint.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates an example system for mitigating subscriber side attacks in a cable network.

The system 100 includes a Cable Modem Termination System (CMTS) 2 having software 9 for mitigating malicious traffic originating from behind cable modems 26 and 27. The software 9 leverages existing DOCSIS protocol functionality to control forwarding by cable modems 26 and 27, which prevents the traffic from entering the cable network 5. Thus, the undesired traffic originating from computers 7 and 8 in the subscriber networks 17 and 18 does not waste bandwidth between the cable modems 26 and 27 and the remote PHYsicial layers (PHYs) 3A and 3B. A further advantage is that the malicious traffic is prevented from consuming processing resources of network devices located in the cable network 5.

Importantly, as will be illustrated in greater detail later with reference to FIG. 2, the CMTS 2 mitigates the malicious traffic independently of whether the cable modems 26 and 27 support UP-DIS or other enhanced functionality that is capable of being disabled by hackers. The techniques used by the CMTS 2 are highly scalable because they do not require reconfiguring cable modems 26 and 27 on a case-by-case basis. Moreover, the techniques used by the CMTS 2 are compatible with existing DOCSIS cable modems, and thus do not require deploying new cable modems or new functionality on existing cable modems.

Figure 2:
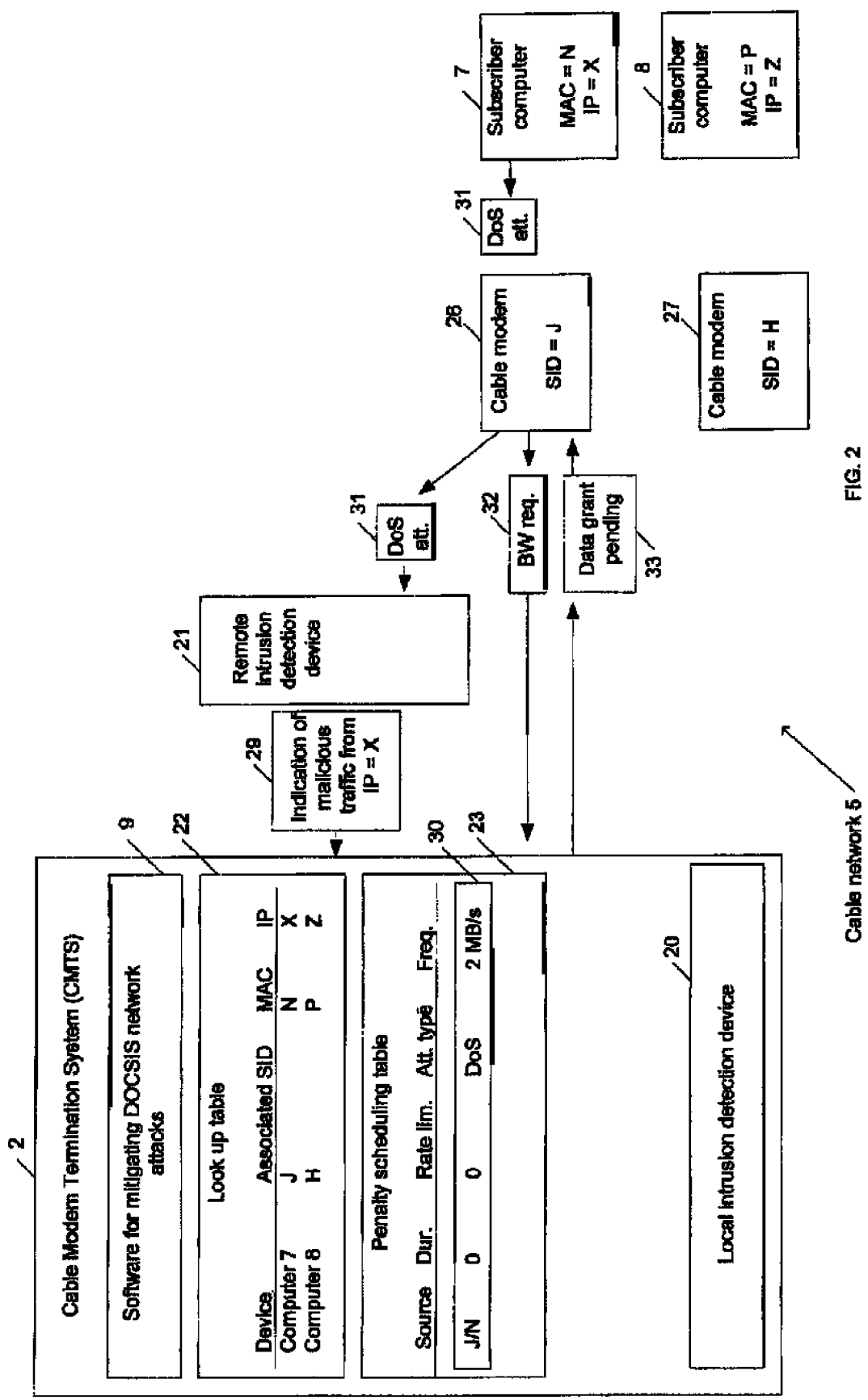
FIG. 2 illustrates one example of how the Cable Modem Termination System (CMTS) shown in FIG. 1 mitigates malicious traffic originating from the subscriber-controlled network.

FIG. 2 illustrates one example of how the CMTS shown in FIG. 1 mitigates malicious traffic originating from a subscriber-controlled network.

In the example, the computer 7 originates undesired traffic, such as Denial of Service (DoS) attack 31. Initially, the DoS attack 31 is undetected and forwarded by the cable modem 26 into the cable network 5.

When the DoS attack 31 is detected, the CMTS 2 is notified of the malicious traffic. In the present example, a remote intrusion detection device 21 performing deep packet inspection on layers three through seven is used to detect the DoS attack 31. The remote intrusion detection device 21 may be integrated into a router or any other network device. The indication 29 sent from device 21 identifies the source IP address X for the DoS attack 31. A local intrusion detection device 20 integrated into the CMTS 2 is also shown to illustrate that a line card or other device integrated into the CMTS may detect the DoS attack 31. The integrated device 20 can be used to inspect traffic layer two of forwarded traffic while the remote device 21 can be used to inspect layers three through seven of forwarded traffic.

The CMTS 2 receives the indication 29 and, according to software 9, compares the IP address X to the look-up table 22. The table 22 or other similar tracking mechanism is typically available on CMTS 2 to track information corresponding to subscriber computers 7 and 8. The table 22 typically associates at least a Service IDentifier (SID) value for the associated cable modem 26, a MAC address of the computer 7 and an IP address X associated with the computer 7. The CMTS 2 associates the SID J and the MAC address N with the DoS attack 31 by comparing the IP address X to the table 22.

Next, according to software 9, the CMTS 2 formats a penalty-scheduling table 23 to include entry 30. The entry 30 preferable identifies the source of the malicious traffic 31 according to the physical address N and the SID J. The entry 30 is formatted with a duration value indicating a duration for imposing a penalty, as well as a rate limit amount to impose during the indicated duration. In the present example, values of zero used in the table 23 cause a permanent penalty prohibiting all communications. The entry 30 may also include information about the malicious traffic 31, such as that the malicious traffic 31 was a DoS type using approximately 2 MB/s of bandwidth. When the information about the characteristics of the undesired traffic is tracked, for scaling benefits this information may be used to automatically calculate the duration. Although in the present example a table 23 is used to track penalty scheduling, in other examples any other tracking mechanism, such as a database, may be used for tracking penalty scheduling.

Thereafter, the technique used to impose the penalty indicated by entry 30 is utilized. This technique, which provides the advantages described previously with reference to FIG. 1, leverages the fact that DOCSIS utilizes a bandwidth request/grant model for upstream traffic. By way of background, under this DOCSIS bandwidth request/grant model, a cable modem sends a Bandwidth Allocation request generally whenever subscriber devices need to send traffic upstream into the cable network 5. The CMTS 2 typically grants these requests using bandwidth MAP messages, unless the cable network 5 is experiencing congestion or unless a subscribed bandwidth amount is being exceeded by the requesting cable modem.

The software 9 leverages this bandwidth request/grant model to enforce the penalty in the following manner. The CMTS 2 compares received bandwidth requests to the table 23 to identify a bandwidth request 32 associated with the entry 30. Once the request 32 is identified, the CMTS 2 determines that the request 32 will not be granted, not on the basis of congestion or a subscribed bandwidth amount, but instead on the basis of the entry 30.

Thereafter, the CMTS 2 sends a data grant pending message 33 that indicates to the cable modem 26 that the bandwidth request 32 is queued and will be granted as soon as network congestion is resolved. However, the CMTS 2 does not actually queue the bandwidth request 32, e.g. the bandwidth request is dropped.

One advantage of using this data grant pending message is that such a message type puts the receiving cable modem 26 in a waiting state, which limits the circumstances under which the receiving cable modem 26 can send additional bandwidth request messages. Also, since the data grant pending message is typically used during congestion, a user observing the response to the bandwidth request is likely to falsely infer that the cable network 5 is congested. Such a false inference by the user is advantageous, as it may deter the user from continuing his attempts.

After the cable modem 26 receives the data grant pending message 33, the cable modem 26 may automatically attempt one or more retries before eventually dropping the traffic from computer 7. Thereafter, if the computer 7 tries to send additional traffic during the duration indicated in the entry 30, the cable modem 26 will once again receive a data grant pending message type, causing the additional traffic to be dropped. Thus, the CMTS 2 effectively mitigates malicious traffic originating from the subscriber networks.

Figure 3:
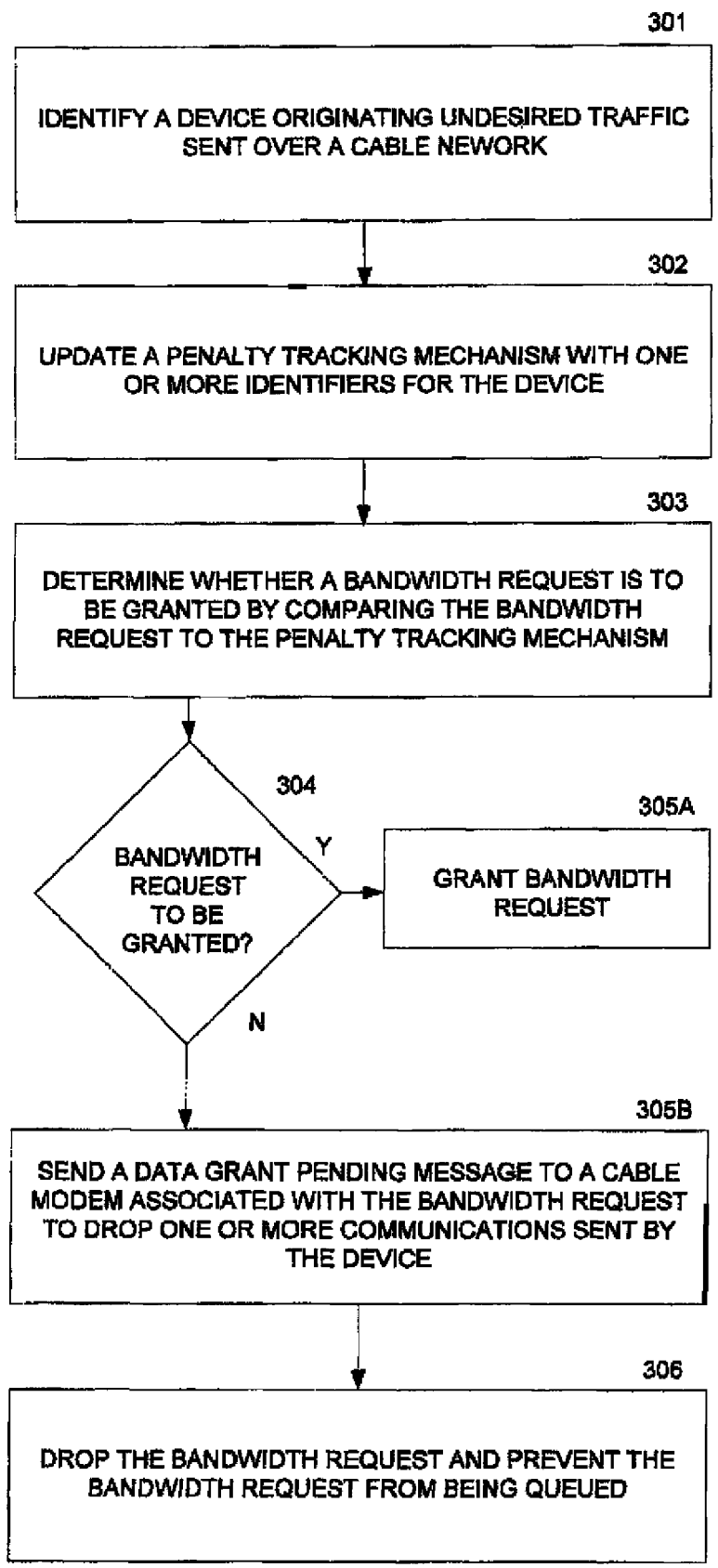
FIG. 3 illustrates an example method for using the CMTS illustrated in FIGS. 1 and 2.

FIG. 3 illustrates an example method for using the CMTS illustrated in FIGS. 1 and 2.

In block 301, the CMTS 2 identifies a device originating undesired traffic sent over a cable network. The CMTS 2 updates a penalty tracking mechanism with one or more identifiers for the device in block 302.

In block 303, the CMTS 2 determines whether a bandwidth request is to be granted by comparing the bandwidth request to the penalty tracking mechanism. When the bandwidth request is to be granted in decision box 304, the CMTS 2 grants the bandwidth request in block 305A.

Otherwise, when the bandwidth request is not to be granted in decision box 304, the CMTS 2 sends a data grant pending message to a cable modem associated with the bandwidth request in block 305B. The CMTS 2 prevents the bandwidth request from being queued by dropping the bandwidth request in block 306.

Several preferred examples have been described above with reference to the accompanying drawings. Various other examples of the invention are also possible and practical. The system may be exemplified in many different forms and should not be construed as being limited to the examples set forth above. For example, the DOCSIS network illustrated in FIG. 1 is a DOCSIS version 3.0 network; however, the features disclosed herein can also be utilized in other earlier/later versions of DOCSIS.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A Cable Modem Termination System (CMTS) comprising:
   one or more processors; and
   a memory coupled to the processors comprising instructions executable by the processors, the processors operable when executing the instructions to:
   determine whether a received cable network bandwidth allocation request is associated with a device designated for penalty scheduling; and send a data grant pending message according to whether the bandwidth allocation request is associated with the device, the data grant pending message indicating that the bandwidth allocation request is in a queue to be granted;

wherein the data grant pending message indicates that the bandwidth allocation request is in the queue to be granted when the bandwidth request is not in the queue, and wherein said sending prevents the bandwidth allocation request and any subsequently-received bandwidth allocation requests for the device from being queued for grant during a penalty scheduling duration.

2. The CMTS of claim 1 wherein the data grant pending message causes a cable modem associated with the device to drop a message originating from the device.

3. The CMTS of claim 1 wherein the device is designated for penalty scheduling in a table stored on the CMTS, the table indicating a Service IDentifier (SID) value for a cable modem associated with the device, a physical address for the device, and a network address associated with the device.

4. The CMTS of claim 1 wherein the processors are operable to select a length for the penalty scheduling duration responsive to communicating with a remote deep packet inspection device or a local device integrated into the CMTS.

5. The CMTS of claim 1 wherein the processors are operable to compare a network address included with the received cable network bandwidth allocation request to a CMTS routing table and base the determination on a result of the comparison.

6. The CMTS of claim 1 wherein the processors are operable to:
  format an entry included in a penalty tracking mechanism;
  wherein the entry includes a selected length for the penalty scheduling duration and a bandwidth restriction amount imposed for the penalty scheduling duration.

7. The CMTS of claim 6 wherein the entry identifies the device using a Service IDentifier (SID) value for a cable modem, a physical address for the device and a the network address.

8. An apparatus, comprising:
  a processing device; and
  a memory coupled to the processing device comprising instructions executable by the processing device, the processing device operable when executing the instructions to:
  identify a device that is an origin for undesired traffic;
  identify a request to grant upstream bandwidth for a communication originated by the identified device; and
  respond to the identified request by sending a data grant pending message, the data grant pending message indicating that the request is queued to be granted, the data grant pending message sent independently of whether the request is queued to be granted;
  wherein the data grant pending message is sent to indicate that the request is queued to be granted despite the request not actually being queued to be granted, and wherein said sending prevents the upstream bandwidth grant request and any subsequently-received upstream bandwidth grant requests for the device from being queued for grant during a penalty scheduling duration.

9. The system of claim 8 wherein the data grant pending message is sent independently of whether a cable network is congested.

10. The system of claim 8 wherein the data grant pending message is sent independently of whether a grant queue is empty.

11. The system of claim 8 wherein the data grant pending message is selected to cause a cable modem associated with the device to drop the communication.

12. The system of claim 8 wherein the processing device is further operable to:
  detect the undesired traffic; and
  identify the device using a network address included in the undesired traffic.

13. The system of claim 8 wherein the processing device is further operable to track both an amount of bandwidth consumed by the undesired traffic and an attack classification for the undesired traffic.

14. The system of claim 13 wherein a length of the penalty scheduling duration is selectable and selected by the processing device according to the amount of bandwidth consumed and the attack classification.

15. The system of claim 14 wherein a zero value is used to indicate selection of a maximum length.

16. The system of claim 8 wherein the identified request is dropped without being queued for grant.

* * * * *

UNITED STATES PATENT AND TRADEMARK OFFICE
CERTIFICATE OF CORRECTION

| | | Page 1 of 1 |
|---|---|---|
| PATENT NO. | : 7,870,285 B2 | |
| APPLICATION NO. | : 11/871894 | |
| DATED | : January 11, 2011 | |
| INVENTOR(S) | : Chang et al. | |

It is certified that error appears in the above-identified patent and that said Letters Patent is hereby corrected as shown below:

At column 5, line 38, please replace "the network" with --network--.

Signed and Sealed this
Twenty-sixth Day of July, 2011

David J. Kappos
*Director of the United States Patent and Trademark Office*